United States Patent
Sharma et al.

(10) Patent No.: US 9,602,677 B2
(45) Date of Patent: Mar. 21, 2017

(54) CHARGING FOR COMMERCIAL GROUP BASED MESSAGING

(71) Applicant: Alcatel-Lucent USA Inc., Murray Hill, NJ (US)

(72) Inventors: Ranjan Sharma, New Albany, OH (US); Yigang Cai, Naperville, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/740,767

(22) Filed: Jun. 16, 2015

(65) Prior Publication Data
US 2016/0373591 A1   Dec. 22, 2016

(51) Int. Cl.
*H04M 15/00* (2006.01)
*H04W 4/08* (2009.01)
*H04W 4/02* (2009.01)

(52) U.S. Cl.
CPC ....... *H04M 15/8077* (2013.01); *H04W 4/021* (2013.01); *H04W 4/08* (2013.01)

(58) Field of Classification Search
CPC .... H04M 15/8077; H04W 4/08; H04W 4/021
USPC ........................................................ 455/406
See application file for complete search history.

(56) References Cited

U.S. PATENT DOCUMENTS

| | | |
|---|---|---|
| 6,832,314 B1 | 12/2004 | Irvin |
| 8,768,388 B2 | 7/2014 | Berry et al. |
| 9,026,076 B2 | 5/2015 | Sharma et al. |
| 2006/0122824 A1* | 6/2006 | Fujiwara ........... H04M 3/53366 704/201 |
| 2012/0009895 A1* | 1/2012 | Kotalwar ................ H04L 12/14 455/406 |
| 2012/0190325 A1* | 7/2012 | Abu-Hakima ...... H04L 12/1845 455/404.2 |
| 2012/0314864 A1* | 12/2012 | Ramprasad ........... H04L 63/065 380/270 |
| 2013/0185372 A1 | 7/2013 | Brusilovsky et al. |

(Continued)

FOREIGN PATENT DOCUMENTS

| | | |
|---|---|---|
| EP | 1690432 B1 | 8/2006 |
| EP | 1840898 B1 | 10/2007 |

(Continued)

OTHER PUBLICATIONS

PCT International Search Report—International Application No. PCT/US2016/037517 filing date—Jun. 15, 2016—mailed on Oct. 5, 2016—5 pages.

*Primary Examiner* — Hirdepal Singh
(74) *Attorney, Agent, or Firm* — Niraj A. Desai

(57) ABSTRACT

Systems and methods for generating charging data records for commercial group-based messages broadcast by a telecommunications network to a group of subscribers are provided. In one aspect, a network element of a telecommunications network is configured to identify individual user devices that successfully received and processed a message that was broadcast over the telecommunications network to a target group of user devices. The identification of the particular devices in the target group of devices that successfully received and processed the broadcast message is used for generating sender based charging or sender-plus-receiver based charging data records for the subscribers of the telecommunication network.

20 Claims, 3 Drawing Sheets

(56) References Cited

U.S. PATENT DOCUMENTS

| | | | |
|---|---|---|---|
| 2013/0281045 A1* | 10/2013 | Daly | H04W 4/02 455/404.1 |
| 2013/0288633 A1* | 10/2013 | Lemberg | H04W 4/14 455/404.1 |
| 2013/0303206 A1 | 11/2013 | Starsinic et al. | |
| 2014/0112251 A1 | 4/2014 | Kim et al. | |
| 2015/0094010 A1* | 4/2015 | Grzywacz | H04W 4/22 455/404.1 |
| 2015/0341889 A1* | 11/2015 | Starsinic | H04W 4/005 370/329 |
| 2016/0007316 A1* | 1/2016 | Vaidya | H04W 64/003 370/312 |

FOREIGN PATENT DOCUMENTS

| | | |
|---|---|---|
| EP | 2009937 B1 | 12/2008 |
| WO | 99/16277 A2 | 4/1999 |
| WO | 2014/109988 A2 | 7/2014 |

\* cited by examiner

100

CHARGING FOR COMMERCIAL GROUP BASED MESSAGING

TECHNICAL FIELD

The present disclosure is directed towards communication systems, and in particular, to charging functions for group messaging in telecommunication systems.

BACKGROUND

Telecommunication service providers typically provide and charge for various services to end users (also referred to as subscribers). Examples of voice services are voice calls, call forwarding, call waiting, etc. Examples of data services are messaging, web-browsing, streaming audio/video, Voice over Internet Protocol (VoIP), online gaming, etc. The data services are managed by a packet core network, which interfaces a subscriber's user equipment (UE) with an external Packet Data Network (PDN), such as the Internet. Some examples of packet core networks include a General Packet Radio Service (GPRS) core network, an Evolved Packet Core (EPC) of a Long Term Evolution (LTE) network, etc. UE's, such as cell phones, personal data assistants, smart phones, notebook computers, or other end user devices may access the data services over the telecommunication service provider networks over an air interface with one or more base stations.

Telecommunication service providers determine charges for services using offline and online charging functions to keep track of resource usages by the subscriber's user device for various services provided to the subscriber. The 3GPP/3GPP2 standards groups have defined a set of specifications that may be used to implement online charging systems and offline charging systems in the various network domains (e.g., a circuit-switched domain, a packet-switched domain, and/or a wireless domain), IP multimedia subsystems, and emerging 3G/OMA application services.

Offline charging provides the basis for post-paid billing, where subscribers are charged at the end of their billing cycle according to their usage. Various network elements (NEs) with an integrated Charging Trigger Function (CTF) provide the inputs to a charging data function (CDF) during subscriber sessions. These inputs are provided via ACRs (Accounting Requests) using Diameter protocol (RFC 3588, 6733). Diameter ACRs are used for both session-related and event-related charging/accounting.

With the advent of Internet of Things (IoT), there has been an explosion in the number of serviceable devices. In machine-type communications (MTC), a number of devices can be serviced via a group-based message. MTC applications generally involve a group of devices and typical applications can involve more than 1000 endpoints for a single subscription. Group-based messaging can efficiently distribute the same message (e.g. a trigger request) to specific MTC group members that fulfill a selection criterion, such as being located within a specific geographical area.

One example of group-based communication is the use of a cell broadcast service as specified in the 3GPP standards. The Cell Broadcast Service (CBS) architecture is specified in 3GPP TS 23.041 and is typically used as a Public Warning System (PWS) to provide for emergency services (e.g., weather alerts, amber alerts, etc.) to subscribers in a geographical area. As PWS services are free, the use of the CBS architecture does not require charging considerations.

However, the CBS architecture (e.g., as implemented by the Cell Broadcast Center (CBC) network element) may also be used for commercial group-messaging, such as for Commercial Mobile Alert Service (CMAS). Besides MTC, group-based communication via CBS can also be used to provide other commercial message broadcasting services, such as enabling a subscriber to transmit a group-message to a group of subscribers that are selected based on desired set of static and dynamic criteria. For service providers that may desire to use the CBS architecture to provide commercial services such as CMAS, systems and methods that provide a flexible mechanism for charging for such services using different types of criteria are desirable.

BRIEF SUMMARY

In various aspects, systems and methods for charging for commercial group-based messages broadcast by a telecommunications services provider are provided.

An apparatus in accordance with one aspect of the present disclosure is configured to: receive a message for broadcast over the telecommunication network; determine a group of target receiver devices for the message; broadcast a decryption key over the telecommunication network based on the determined group of target receiver devices; encrypt and broadcast the message over the telecommunication network based on the determined group of target receiver devices; determine one or more actual receiver devices in the group of target receiver devices that successfully received and decrypted the message; and, generate one or more charging messages based on the determined actual receiver devices of the broadcasted message.

In one aspect, the apparatus is further configured to receive one or more acknowledgement messages from one or more devices in the group of target devices; and, determine the one or more actual receiver devices in the group of target receiver devices that successfully received and decrypted the message based on the one or more acknowledgement messages.

In one aspect, the apparatus is further configured to generate at least one of the one or more charging messages as an Accounting Request Message using the Diameter protocol.

In one aspect, the apparatus is further configured to identify at least one of the determined actual receiver devices in at least one of the charging messages.

In one aspect, the apparatus is further configured to identify each of the determined actual receiver devices in at least one of the charging messages.

In one aspect, the apparatus is a Service Capability Server (SCS) network element or a Cell Broadcast Center (CBC) network element of the telecommunications network.

In one aspect, the apparatus is further configured to not generate a charging message for any device in the group of target receiver devices that is not determined as an actual receiver device of the broadcasted message.

In one aspect, the apparatus is further configured to generate at least one charging message for charging a sender-subscriber of the telecommunications network of the message based on the number of the determined actual receiver devices.

In one aspect, the apparatus is further configured to generate at least one charging message for charging a receiver-subscriber of the telecommunication network associated with at least one of the determined actual receiver devices.

In one aspect, the apparatus is further configured to determine the group of target receiver devices for the message based on the type of the message.

In one aspect, the apparatus is further configured to determine a group of target receiver devices for the message based on a group identifier.

In one aspect, the apparatus is further configured to determine the group of target receiver devices for the message based on a geographical area.

DETAILED DESCRIPTION

Figure 1:
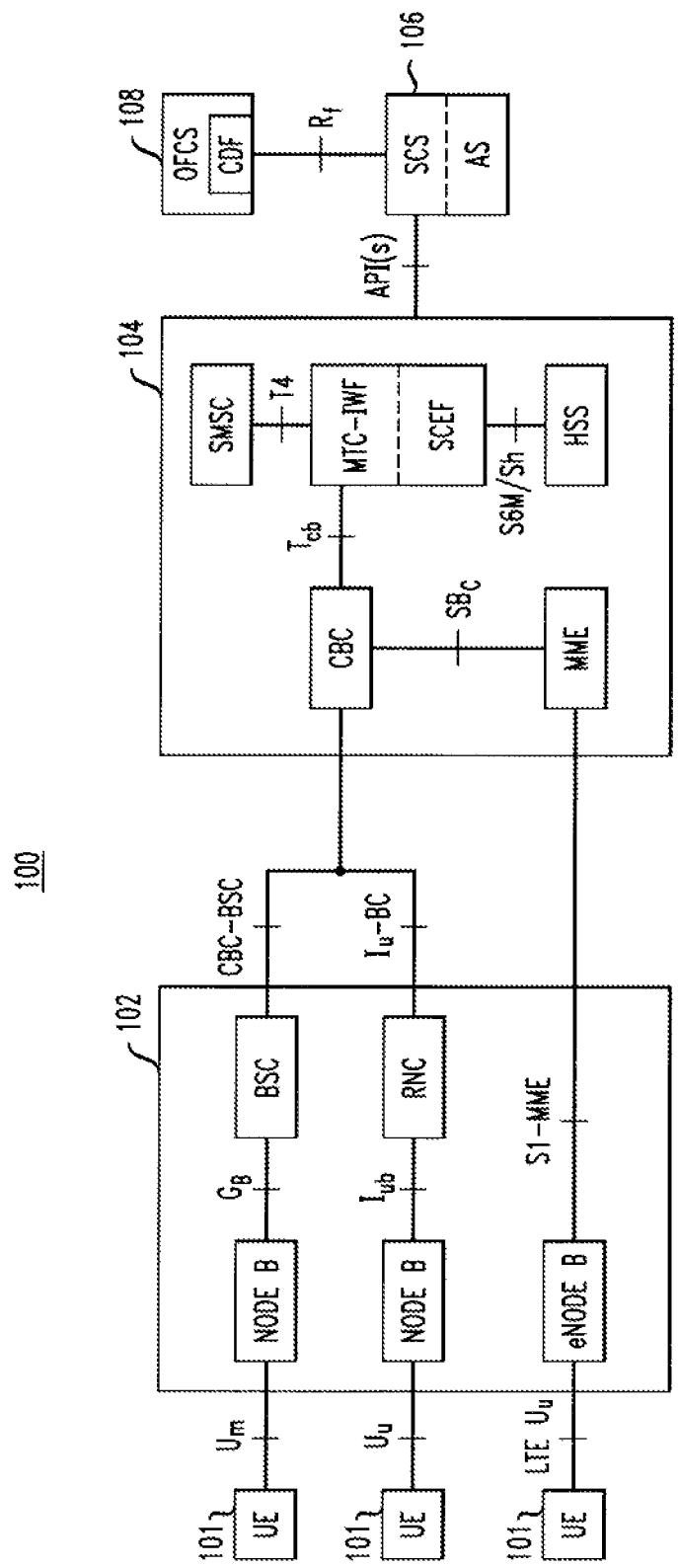
FIG. 1 illustrates an example embodiment of an enhanced service aware network that enables charging for group based messaging.

Various aspects of the disclosure are described below with reference to the accompanying drawings, in which like numbers refer to like elements throughout the description of the figures. The description and drawings merely illustrate the principles of the disclosure. It will be appreciated that those skilled in the art will be able to devise various arrangements that, although not explicitly described or shown herein, embody the principles and are included within spirit and scope of the disclosure.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted in a like fashion.

There are various possible ways of charging for messages that are broadcast via a telecommunications network to the respective user equipment of a group of subscribers. In sender based charging, the sender-subscriber ("sender") of the group-based message may be charged when the sender transmits a group-based message that is broadcast via a telecommunications network to UEs of a target group of receiver-subscribers ("target receivers"). The charges that are assessed to the sender may be adjusted based on various criteria, such as the size of the message, the geographical area of the broadcast, or the static size of the designated group of target receivers to whom the message is broadcast. The sender based charges may be also be adjusted dynamically, such that the sender is charged only for particular receivers in the designated group of target receivers that actually receive the message ("actual receivers"), as opposed to charging the sender based on the static number of target receivers regardless of the number of actual receivers.

In sender-plus-receiver based charging, both the sender and the receivers of the group-based message may be charged for a group-based message. The charges that are assessed to the sender and the receivers may be adjusted based on various criteria, such as the size of the message or Quality of Service (QoS). The sender-plus-receiver based charges may also be adjusted such that the sender is charged based on the actual receivers of the broadcasted group-based message as opposed to the size of message, the geographical area, or the number of target receivers in the group, and, similarly, only the actual receivers that receive the broadcasted group-based message (at a receiver UE) are charged whereas those target receivers that do not actually receive the message are not charged.

The 3GPP group describes enhancements to group-based messaging in 3GPP TR 23.769 ("Group based Enhancements"), Release 13.0, the contents of which are incorporated by reference herein in its entirety. In particular, 3GPP TR 23.769 describes the enhancements to the 3GPP architecture needed to handle multiple end-point UEs which constitute a group. Although charging is mentioned in 3GPP TR 23.769, the only aspects that are considered are the size of the message, the geographic area where the message is sent, and the number of times the message needs to be broadcast.

Missing from the enhancements described in 3GPP TR 23.769 are charging aspects that are described herein. For example, 3GPP TR 23.769 does not provide a mechanism for sender-plus-receiver based charging for messages broadcast in a geographical area. Furthermore, conventional sender based charging can also be improved because it can at best be approximate and it does not address the situation where the group participants belong to different cellular service providers. If an attempt is made to base the charging on the group information, then it is a possibility that the group information may change between the time a group broadcast message is sent and the billing system access of the group information to get information on number of recipients. Additionally, group members or target receivers may not all receive messages, as not all group members may be inside a given geographic area at the time the message is broadcast. Of note, 3GPP TR 23.769 also does not address broadcasting a message to those subscribers of the group that are not in the destination area chosen for the broadcast.

Aspects of sender based charging and sender-plus-receiver based charging based on the number of actual receivers of a commercial group-based message are missing from the current 3GPP CBS/CMAS specifications. Part of the reason is that a mechanism for identification of actual receivers of a group-based message that is broadcast in one or more geographical areas is not provided, and the other part is that CMAS is still fairly new and evolving.

The present disclosure describes systems and methods that address these gaps. One aspect of the present disclosure enables identification of actual receivers of a commercial group-based message that is designated for delivery to a group of target receivers (e.g., via a broadcast of the message to target receiver UEs or devices in one or more geographical areas). The systems and methods described herein further enable dynamically determining the group of target receivers based on the geographical location and/or capability information of one or more receiver UEs associated with a group of receivers.

FIG. 1 is a diagram of an exemplary system 100 in which the techniques described herein may be employed. System 100 includes a number of UEs 101, an access network (AN) 102, a packet switched (PS) core network (CN) 104, a Service Capability Server/Application Server (SCS) 106, and an Offline Charging System (OFCS 108) that are communicatively interconnected with each other via one or more 3GPP interface protocols as shown in FIG. 1.

UEs 101 are devices that are associated with end-users or subscribers of a telecommunications network. UEs 101 may be a mobile telephone, a smart-phone, a wireless personal digital assistant (PDA), a mobile internet device (MID), a computer, a tablet, a wearable device, or any device configured to communicate with the CN 104 via the AN 102.

AN 102 may be any network of devices configured to provide a communication interface between UEs 101 with the CN 104. In the example of FIG. 1, AN 102 is a wireless Radio Access Network (RAN). RAN 102 may include a number of conventional RAN network elements, such as one or more base transceiver stations (BTS), which are illustrated as NodeBs or eNodeBs in FIG. 1. RAN 102 may also include one or more BTS controllers, which are illustrated as a Base Station Controller (BSC) and Radio Network Controller (RNC).

Each of the UEs 101 is configured to wirelessly communicate with the CN 104 via the NodeB or an eNodeB of the RAN 102. The NodeB or eNodeB of the RAN 102 provides wireless coverage of a specific geographic area commonly known as a "cell". UEs within a particular cell wirelessly communicate with the NodeB or the eNodeB to access the CN 104, as will be understood by one or skill in the art.

While only a few UEs, BTS, and BTS controllers are illustrated in FIG. 1, it will be appreciated that in practice system RAN 102 can include additional BTS and BTS controllers that can serve a large number of UEs in particular geographical areas. Ran 102 may also include other conventional network elements (e.g., an Access Services Network Gateway (ASN-GW)), which are typically in a RAN and are omitted herein for brevity.

CN 104 is configured to make various services available to the UEs 101 via the RAN 102. For instance, CN 104 may include one or more network elements that provide a UE 101 with access to one or more services provided on packet data networks (PDN), such as the Internet, intranet or other networks. Exemplary services include (but are not limited to) Voice over Internet Protocol (VoIP) telephony, messaging, web browsing, content (e.g., video and/or audio) delivery, interactive gaming, and so forth.

CN 104 is communicatively interconnected to a Service Capability Server (SCS) 106, which in turn is communicatively interconnected with an Offline Charging System (OFCS) 108. SCS 106 is configured to enable an external application service provider's Application Server (AS), such as a messaging server, to communicate with the CN 104 via one or more application programming interfaces (APIs) and enable the AS to exchange information and data with the one or more UEs 101. Although the AS is shown as being integrated with the SCS 106 in FIG. 1 for brevity, in other embodiments the SCS and the AS may be implemented as separate servers or devices that are communicatively interconnected with each other.

As shown in FIG. 1, SCS 106 is also communicatively interconnected with the Offline Charging System (OFCS) 108, which is one of the aspects of the present disclosure. OFCS 108 comprises any system, server, or function operable to provide offline charging for services/sessions accessed by end users, such as via UEs 101. OFCS 108 may include a group of charging functions used for offline charging for group-based messaging. A charging function may be configured to receive accounting requests (e.g., Diameter charging events) from the SCS 106 (which may be integrated with functionality of a Charging Trigger Function (CTF)), and use the charging information contained in the accounting requests to construct Charging Data Records (CDRs) for sender based and sender-plus-receiver based charging. One example of a charging function is a Charging Data Function (CDF) as defined by the 3GPP in TS 32.240, the contents of which are incorporated by reference herein in its entirety. The purpose of offline charging is to transform the charging information into CDRs that are post-processed within a Billing Domain (BD) for the purpose of generating bills.

Offline charging can be categorized into two distinct classes: event-based charging and session-based charging. In event-based charging, a chargeable event is defined as a single end-user-to-network transaction, such as broadcasting a group-based message to UEs in a geographical area in accordance with aspects of the present disclosure. The single transaction is mapped to a charging event, which results in a single CDR. In session-based charging, a user session is established resulting in the generation of multiple chargeable/charging events and the generation of one or more CDRs. In session-based charging, at least two charging events are typically generated for each session. One charging event describes the start of the session, and the other charging event describes the end of the session. Multiple other charging events, so called interim charging events, may also be utilized to describe changes to session characteristics (i.e., change of charging conditions), when a time limit is reached, when a volume limit is reached, etc.

In general operation, UEs 101 may be configured to exchange wireless signals with one or more of the BTS in RAN 102. Thus, UEs 101 are configured to communicate, via the CN 104, with services or applications provided by an AS in an external packet data network (PDN), such as the Internet. Example services include voice over Internet Protocol (VoIP) telephony, messaging, web browsing, content (e.g., video and/or audio) delivery, interactive gaming, or any other applications. End users that are served by the CN 104 are subscribed to offline charging for group-based messaging such that when a group-based message is broadcast to the UEs 101 of the subscribers via the SCS 106 and the CN 104, the SCS 106 is configured to report charging events to an Offline Charging System (OFCS) for billing in accordance with aspects discussed further below.

In one aspect, when a group-based message is broadcast via the CN 104, the SCS 106 is configured to report a charging event to the OFCS in the form an accounting request, such as a Diameter Rf Accounting Request (ACR). In one aspect, the OFCS is configured to generate Charging Data Records (CDR) for sender based charging or a sender-plus-receiver based charging based on the accounting requests that are received. At some point in time, the OFCS passes the CDRs to the billing domain where a bill is generated at the end of a billing cycle (e.g., a monthly billing cycle). The network operator can then send out a bill to the end user that specifies the usage by the end user during the billing cycle.

As shown in FIG. 1, in one embodiment CN 104 includes a Mobility Management Entity (MME), a Cell Broadcast Center (CBC), a Short Message Service Center (SMSC), a Home Subscriber Server (HSS), a Service Capability Exposure Function (SCEF), and a Machine Type Communication Interworking Function (MTC-IWF). CN 104 may also include other network elements that are not shown in FIG. 1 for ease of illustration. One example of CN 104 is an Evolved Packet Core (EPC) network. One example of a network element included in the CN 104 may be a Serving Gateway (S-GW) of an EPC network as described in the LTE standards. Another example of a network element may be a Packet Data Network Gateway (PDN-GW) of an EPC network as described in the LTE standards.

The HSS is a network element that functions as the master database for a given subscriber or user. It is the entity containing the subscription-related information to support the network entities actually handling calls/sessions. A Home Network may contain one or several HSSs, depending on the number of mobile subscribers, on the capacity of the equipment and on the organization of the network. As an example, the HSS may provide support to the call control servers in order to complete the routing/roaming procedures by solving authentication, authorization, naming/addressing resolution, location dependencies, etc.

The MME is a network element that functions as control-node for the LTE access-network. The MME is responsible for idle mode UE (User Equipment) tracking and paging procedure including retransmissions. The MME is involved in the bearer activation/deactivation process and is also responsible for intra-LTE handover involving Core Network (CN) node relocation. The MME is responsible for authenticating a user (by interacting with the HSS). The MME is in charge of all the Control plane functions related to subscriber and session management. The MME may be linked to the HSS, which supports the database containing all the user subscription information, via the Diameter protocol. The base Diameter protocol defines the basic Diameter message format. Data is carried within a Diameter message as a collection of Attribute Value Pairs (AVP). An AVP consists of multiple fields: an AVP Code, a Length, Flags, and Data. Some AVPs are used by the Diameter base protocol, while other AVPs are intended for the Diameter application.

The SMSC is a network element that enables SMS messages. Generally, when a text message (SMS message) is transmitted from one user to another user via the CN 104, the message gets stored in the SMSC, which enables delivery to the destination user when they are available. It should be noted that the SMSC may also be replaced or combined with an IP-Short-Message-Gateway (IP-SM-GW).

CBC is a network element that enables "Cell Broadcast Service" or CBS/PWS functionality, or the ability to broadcast one or more group-based messages to UEs in one or more geographical cells of a telecommunication network. In the case of the Public Warning System (PWS), the messages are the Warning notification messages that are broadcast to UEs free of charge. In the present disclosure, the CBC (along with other network elements including the SCS and the OFCS), is configured to broadcast commercial group-based messages in a manner that supports charging considerations (e.g., sender based charging or sender-plus-receiver based charging) as is described herein below. As shown in FIG. 1, CBC is configured broadcast group-based messages the UEs 101 via any of the BSC, the RNC, or the MME depending on the capabilities of the UEs, as will be understood by those of skill in the art.

MTC/IWF is a network element that is configured to control interworking between an MTC server (e.g., an external AS server of a application service provider) and the CN 104, and may serve as proxy of an MTC operation, e.g., to enable group-based messaging to one or more MTC devices or UEs of the CN 104. The MTC-IWF may perform various functions, such as authenticating the MTC server, authenticating a control plane request requested by the MTC server, and various other functions related to a trigger indication, to enable an MTC AS server to establish a desired communication channel with the 3GPP core network.

SCEF is a network element that securely exposes the services and capabilities provided by 3GPP network for interfacing with external application providers. SCEF enables an AS in an external PDN to interface with the CN 104 via one or more APIs supported by the SCEF. The SCEF is configured to work in conjunction with the SCS to enable an external AS to provide services and data to one or more subscribers of the CN 104.

Figure 2:
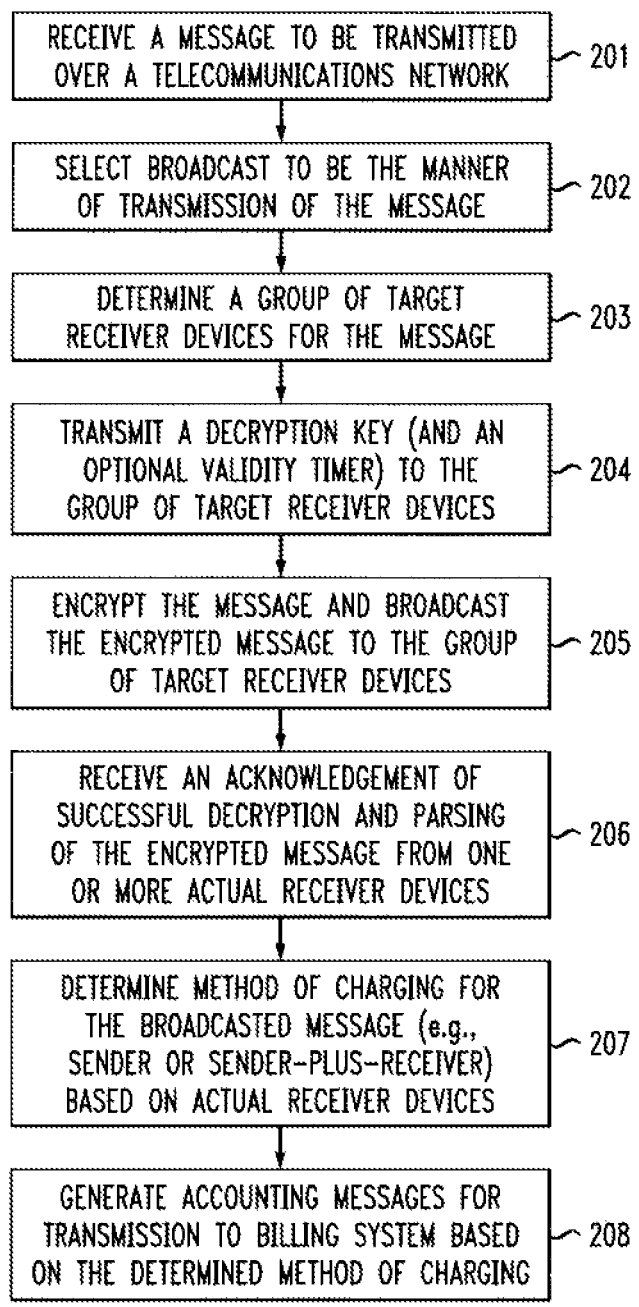
FIG. 2 illustrates an example process in accordance with various aspects of the disclosure.

Having provided a broad architectural description for the system 100 illustrated in FIG. 1, operations in accordance with various aspects of the disclosure are now described in conjunction with system 100 and process 200 illustrated in FIG. 2.

It is assumed that the AS provides the SCS 106 with contents of a group-based message to be transmitted to a group of target UEs associated with a group of target subscribers. SCS 106 receives the contents of the group-based message from the AS and provides the message to the SCEF of the CN 104 using one or more appropriate APIs. The SCEF is configured for selection of the broadcast delivery mode, and it is further assumed for the purposes of the disclosure that based on business agreements, the SCEF selects the CBC which provides the CBS service as the method to broadcast the group-based message in one or more geographical areas or "cells". Although the CBC is illustrated as a separate entity in CN 104, in other embodiments the CBC may be integrated into other network elements, such as the MTC-IWF or the SCEF. The SCEF/CBC enables broadcast of the group message to UEs in one or more geographic cells by determining, for example, one or more of message content, group identification, target area identification (e.g., geographic area, a cell, a cell sector, a group of cells, or PLMN), any applicable radio access technology distinction (such as 4G only, which makes sense for dense message content delivery), frequency of broadcast, number of times the message is transmitted, time window that is used to randomize the responses of the triggered devices to control message flood, etc.

It may be possible to not include target area identification information in the message if a target receiver location (e.g., a target receiver UE location) within the group is known ahead of time (e.g., in MTC, where one or more UE devices are stationary). When sent, the CBC or the MTC-IWF/SCEF may query the HLR/HSS and map the group identification to cell broadcast group. With the query, the CBC or the MTC-IWF/SCEF can also determine the correct cell broadcast node that would be used for the transmission, or this information can be statically defined in the MTC-IWF, SCEF, or the CBC. Messages sent via the cell broadcast are distinguished by use of a new message type that is used by MTC-IWF or the SCEF; the MTC-IWF or the SCEF is also configured to add the message type and forward the message to the CBC for broadcasting to one or more target receivers.

The SCEF is the network element that has been proposed for generating the CDR for offline charging purposes in the current art. Also, currently, mechanism exists where UEs can be configured to receive and process or receive and discard specific broadcasts with pre-provisioned message identifiers. Thus, a sender of a broadcast message can choose to use the cell broadcast message ID information element as a way to choose the recipients, and depend on the provisioning on the grouped UEs to handle the message or discard them. Alternatively, the sender can choose group identification to reach out to all members of the group. Both approaches provide a workable solution for sender based charging and telecommunication networks can provide the coexistence of these approaches. It is also possible to use the same message ID across multiple groups (which would require specification of group identification in the message the sender broadcasts), or use dedicated message IDs within each group (which would require a simpler lookup that would provide the group information based on the message ID information element). Both these approaches are discussed in the 3GPP TR 23.769. The message ID information element as a group message identifier can be incorporated in either paging message or SIB in radio interface broadcasted from cell to UEs.

The present disclosure provides alternative systems and methods, which enable sender based and sender-plus receiver based charging for messages that are broadcast to a group of receivers. The systems and methods disclosed herein advantageously enable a telecommunications network provider to support charging for commercially broadcast messages in various ways, such as sender based charging and sender-plus-receiver based charging, which, as discussed above, is not supported by the current 3GPP standards. In one non-limiting embodiment, one difference between the architecture proposed in 3GPP TR 23.769 for charging is that the present disclosure provides for an interconnection between the SCS 106 and the OFCS 108 via the Diameter interface. In various aspects, the SCS 106 is thus enabled to provide both sender charging information and sender-plus-receiver charging information to the OFCS 108.

Furthermore, in accordance with one aspect of the disclosure, the CBC is configured to distribute a time-sensitive encryption/decryption key to one or more of the target receiver devices prior to broadcasting the group-based message in one or more geographical areas as described below. New functionality with respect to the SCS and the OFCS network elements are also described herein in accordance with aspects of the disclosure. For the purposes of the operations described herein, it is assumed that the group of target receiver devices of the group-based message includes an N number of UEs, of which an M number are located in a broadcast distribution area or cell chosen by the CBC for broadcast of the message. Here, N>=M. It is also assumed that the group-based message broadcast is not a PWS message, and that offline charging (either sender based or sender-plus-receiver based) applies.

With reference to FIGS. 1, and 2, in step 201, SCS 106 receives a message to be transmitted to a group of subscriber UEs associated with a group of end users of a telecommunication network. For example, the AS may provide, to the SCS 106, contents of a message to be commercially transmitted to a group of target receiver devices or target UEs of the CN 104 via the telecommunication system 100. The message may be a text message that includes text as its content, a multi-media message that includes multi-media content, or a combination thereof. The SCS may receive the message from the AS and communicate with the SCEF in the CN 104 via one or more exposed APIs, which may transmit the message to the MTC-IWF network element.

In step 202 the MTC-IWF (or the SCEF) selects the broadcast delivery route as the method of delivering the message to the group of target receiver UEs, and transmits the message to the CBC. Such determination may be made, for example, based on one or more target locations identified in the message, one or more group IDs identified in the message, the type of message, etc.

In step 203, the CBC determines the identity of the group of target receiver devices for the message. For example, the CBC may query the HSS database with information for determining the group of target receiver devices for the message. The CBC may query the HSS based on the type or message ID identified in the message, a group ID identified in the message, a geographical location identified in the message, or based on any combination thereof or other fields indicated in the message to identify an appropriate group of target receivers for the message.

The CBC may receive information for determining the identities of the group of target receivers from the HSS. For example, the HSS may return information from the database that identifies the group of target receiver devices that meet the parameters of the query.

In step 204, the CBC broadcasts a decryption key and, in some embodiments, a validity timer to the determined group of target receiver devices. For example, in one embodiment the CBC may identify the geographic destination(s) (e.g., one or more geographical cells) for the message to be broadcast based on information or criteria such as, for example, cell, cell sector, group of cells, Public Land Mobile Network (PLMN), or the identities of the group of target receiver devices. Such criteria information may be included in the message by the sender of the message (the application service provider), or may be determined based on information stored in the HSS and received by the CBC (e.g., location information of stationary or non-stationary target receiver devices).

Once the target set of receiver UEs and/or the geographic destination of the message are identified as described above, the CBC may broadcast, via the RAN 102, a decryption key and, in some embodiments, a validity timer to the UEs that are associated with the cells or geographical area and are the determined target receiver devices for message delivery for the group message.

For example, the CBC may transmit the decryption key (and the validity timer) to one or more NodeBs or eNodeBs for respective cells via the MME, the BTC, or the RNC. The UE's in one or more cells associated with the NodeBs and the eNodeBs may thus receive a broadcast of the decryption key and the validity timer sent by the CBC. In some embodiments, only those target UEs which have been pre-configured to receive a message having the message ID or group ID are sent the key to decrypt the message from the CBC.

In step 205, the CBC encrypts and broadcasts the group message to the UEs associated with the one or more target geographical areas via the RAN 102. For example, the CBC may broadcast the encrypted message to one or more NodeBs or eNodeBs for respective geographic areas or cells via the MME, the BTC, or the RNC. Only the UEs that are configured (e.g., subscribed) to receive and decipher the message (using the decryption key, and, optionally, before expiration of a time period specified by the validity timer) are able to receive and message and parse or decrypt the contents of the message.

Furthermore, the encrypted message transmitted by the CBC may mandate, based on the populating of the Protocol Description Unit (PDU) field(s) of the message, that the target UEs that receive and decrypt the message successfully respond with a positive acknowledgment (e.g., within a time period indicated by the validity timer in some embodiments). Such mandate for the positive acknowledgement of the encrypted message by the receiver UEs that actually receive and parse the message correctly may be mandated as part of one or more PDU fields of the message transmitted by the SCS 106, or in some embodiments, by the SCEF/MTC-IWF, or the CBC.

In step 206, UEs that have received the decryption key and were able to properly decrypt the message and the protocol description unit (PDU) transmit an acknowledgement of the successfully receipt and processing of the message to the CN 104 via the RAN 104.

In step 207, the acknowledgement is received by the CBC in the CN 104 and is forwarded to the SCS/AS. For example, the CBC (via the SCEF/MTC-IWF) may transmit the message using appropriate APIs to the SCS using a time window for response randomization so as to keep the control plane of the CN 104 from flooding with acknowledgment messages.

Thus, for instance, the SCS may receive positive acknowledgement from M actual receiver devices of the message out of the overall total of N target receiver devices at the SCS/AS.

In step 208, the SCS determines charging for the group message using sender based charging or sender-plus-receiver based charging and generates and transmits appropriate accounting messages the OFCS. In various embodiments, for example, such determination as to whether to charge for the group message using sender based charging or sender-plus-receiver based charging may be made based on the type of the message, message group ID, identity of the sender, the number of members of in the group of target receivers, number of actual receivers and their identities, or other business criteria or agreements.

If the SCS determines to charge for the broadcasted group message using sender based charging, the SCS may generate and transmit, (e.g., in conjunction with a Charging Trigger Function (CTF) network element that may be integrated into the SCS), a sender-only Diameter Accounting Request (ACR), to a CDF network element of the OFCS 108. The ACR may indicate whether to charge the sender based on the target number of receivers of the message, or based on the actual number of receivers that received the message. This may be enabled by the SCS by including, in appropriate fields of the ACR data that indicates the actual number of receivers of the message.

If the SCS determines to charge for the broadcasted group message using sender-plus-receiver based charging, the SCS may generate and transmit, (e.g., in conjunction with a Charging Trigger Function (CTF) network element that may be integrated into the SCS), a Diameter Accounting Request (ACR) containing a list of UEs that are the actual receivers of the message to enable the OFCS to generate the appropriate CDRs for charging both the sender and the actual receivers of the message.

Alternatively, if the SCS determines to charge for the broadcasted group message using sender-plus-receiver based charging, the SCS may, in another embodiment, also generate and transmit, e.g., using the Charging Trigger Function (CTF), individual ACRs for the sender and each of the UEs that actually received the message to enable the CDF network element of the OFCS to generated appropriate individual CDRs for charging both the sender and the actual receivers of the message. This embodiment may be more advantageous for MTC devices that are stationary and in power-saving mode (for cases when their battery is low). Those depleted devices may be in limited state, with weak channel conditions etc., and a no response from them would provide for a better charging approach than listing all the devices together in a CDR based on the group membership alone. The devices or UEs in power saving mode in any case do not receive group messages, even when retransmission is in effect. Therefore, this approach provides a better way of charging for the network resource usage. For the case where a group based message is broadcast to UEs subscribed to different cellular operators, transmitting individual ACRs for each of the actual receivers of the message enables generation of CDRs by the CDF at the OFCS 108 that can be used for Transferred Account Procedure (TAP) so correct charges can be applied to the members of the group that are served by a different cellular provider.

Various aspects that enable sender based charging and sender-plus-receiver based charging have been described above, which enhance the 3GPP standards for charging mechanisms for commercial broadcast messages. A particular implementation with respect to the interaction between the SCS 106 and the OFCS 108 is now described below. It should be understood that the implementation below is not intended to be limiting, and in other embodiments different implementations may be employed without departing from the principles of the disclosure.

In one embodiment, the ACR transmitted by the SCS 106 to the OFCS 108 may include newly proposed additional Address Value Pairs (AVPs) for enabling sender-plus-receiver based charging in the OFCS as follows:

CMAS-Information::=<AVP Header:>
[TMGI]
[CMAS-Service-Type]
[CMAS-User-Service-Type]
[CMAS-Group-Service-Identity]
[CMAS-Group-Service-Charging-Mode]
[File-Repair-Supported]
[Required-CMAS-Bearer-Capabilities]
[CMAS-2G-3G-Indicator]
[RAI]
[CMAS-Service-Area]
[CMAS-Session-Identity]
[CMAS-Volume]
[CMAS-Group-UE-Identity]
[CN-IP-Multicast-Distribution]
[MBMS GW-Address]

Here, proposed new sub-AVPs in CMAS-Information ACR are underlined and described below, remaining or presently existing AVPs are not underlined are similar to the AVPs defined in the MBMS-Information grouped AVP, as will be understood by those of skill in the art.

CMAS-Group-Service-Identity: This AVP may be provided to the CDF of the OFCS 108 to indicate the group or sub-group ID of the group-based message that is broadcast. It may also be associated with the MTC group ID and the encryption/decryption code. This ID may be mapped to the CMAS MTC group messaging enabled UEs in time window indicated using the validity timer value.

CMAS-Group-Service-Charging-Mode: This AVP may be provided to the CDF of the OFCS 108 to indicate the charging mode for the group-based message, such as, for example, content provider based charging (e.g., sender based charging, individual UE group messaging service charging (e.g., sender-plus-receiver based charging), group/sub-group UEs group messaging service charging (e.g., sender-plus-receiver based charging), to provide a few examples.

CMAS-Volume: This may be provided to the CDF of the OFCS 108 to indicate the data volume of group-based message in an event ACR or a session ACR.

CMAS-Group-UE-Identity: this is a multiple occurrence AVP that may be provided to the CDF of the OFCS 108 to respectively list the identities of the UEs that actually received the group based message (e.g., identities of UEs from which a positive acknowledgment was received by the SCS). The inclusion of the identity of each actual receiver of the group-message enables CDF network element the OFCS 108 to generate respective CDRs for charging each UE that actually received the broadcasted message, in conjunction with the CMAS-Group-Service-Charging-Mode Upon receipt of the newly proposed additional AVPs described above in the augmented CMAS-Information AVP in the ACR, one or more network elements OFCS 108, such as the CDF network element may be configured to process the new AVPs as follows:

Determine the CMAS-Group-Service-Charging-Mode indicated in the received ACR, and, if content-provider (e.g., sender) based charging is indicated, generate a single CDR for the broadcast message. This single CDR may be generated by the CDF of the OFCS to include the count M (received from the SCS in the ACR), indicating the total number of UEs (or devices) that actually received the group broadcast message as described above. The inclusion of total number of actual receivers allows billing system of the telecommunication provider to appropriately charge the sender of the group based message based on the total number of actual receivers, in conjunction with other conventional charging considerations such as agreement policies, rating plan, message size, type of message (e.g., text or multimedia), geographical area, etc.

If the CMAS-Group-Service-Charging-Mode indicates individual UE charging (e.g., sender-plus-receiver based charging), then the CDF network element of the OFCS 108 may be configured to generate (in addition to the CDR for charging the sender) a CDR for each UE that actually received the message, where the list of the UEs (or devices) that actually received the message are individually identified by respective ones of the CMAS-Group-UE-Identity AVPS. Thus the billing system of the telecommunication provider may appropriately charge, not only the sender of the group-based message based on the total number of actual receivers, but also the actual receivers of the group-based message. Advantageously, the systems and methods disclosed herein enable charging for only those UEs that actually received and processed the message, while out-of-area UEs or those UEs that did not receive the decryption key and did not successfully receive the message are not charged for the broadcasted message.

If the CMAS-Group-Service-Charging-Mode indicates a group/sub-group charging, then the CDF network element of the OFCS 108 may be configured to generate a CDR on a per group/sub-group basis, without having to, for example, determine the actual receiver UEs within the group/sub-group and without having to adjust for those UEs that may be out of area at the moment Depending on the charging mode, the CDF network element of the OFCS 108 may be configured to associate the CMAS-Volume with each CDR individually, or to aggregate for the group/sub-group, with an option to adjust the volume for those UEs that did not receive the message.

The CMAS-Group-Service-Identity and the validity start time/stop timer may be used by the CDF network element of the OFCS 108 to determine the service group of UEs in the broadcasted area to be charged.

It will be apparent from the foregoing that many modifications are possible without departing from the spirit and scope of the invention, which is defined in the appended claims. For example, although certain networks or network elements, such as the OFCS 108, are indicated as being outside the CN 104, in some embodiments they may be integrated into the CN 104. Furthermore, although various functionality, aspects or steps are ascribed to particular network elements illustrated in FIG. 1, such as the SCS 106, the SCEF/MTC-IWF or the CBC in CN 104, it will be appreciated that in other embodiments the aspects described herein may be implemented in different network elements, and that certain network elements, although described individually, may be combined with other network elements.

Any of the various network elements shown in the figures or described herein may be implemented as hardware, software, firmware, or some combination of these. For example, a network element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, other hardware implementations such as, for example, digital signal processor (DSP) hardware, a network processor, application specific integrated circuit (ASIC) or other circuitry, field programmable gate array (FPGA), read only memory (ROM) for storing software, random access memory (RAM), non-volatile storage, or some other physical computing hardware component or module.

Figure 3:
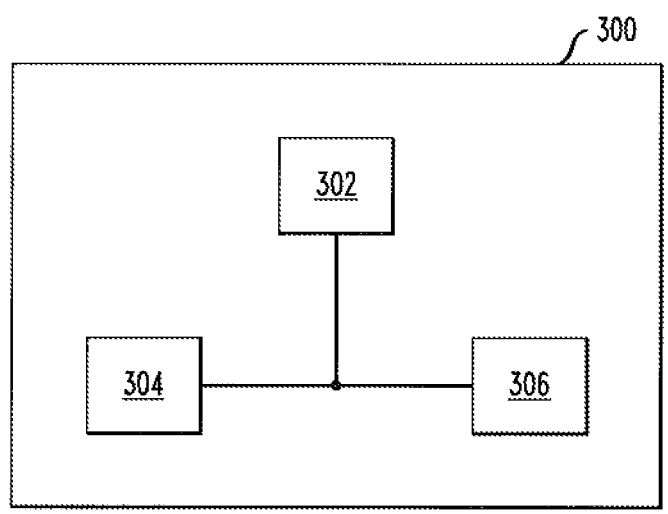
FIG. 3 illustrates a block-diagram example of an apparatus for implementing various aspects of the disclosure.

FIG. 3 depicts a high-level block diagram of a computing apparatus 300 suitable for implementing various aspects of the disclosure (e.g., one or more network elements described herein or one or more steps or operations described herein). Although illustrated in a single block, in other embodiments the apparatus 300 may also be implemented using parallel and distributed architectures. Thus, for example, various steps or functionality described herein, such as the steps illustrated in the example of process 300 may be executed using apparatus 300 sequentially, in parallel, or in a different order based on particular implementations. Apparatus 300 includes a processor 302 (e.g., a central processing unit ("CPU")), that is communicatively interconnected with various input/output devices 304 and a memory 306. Apparatus 300 may be implemented as one or more blades in a blade chassis.

The processor 302 may be any type of processor such as a general purpose central processing unit ("CPU") or a dedicated microprocessor such as an embedded microcontroller or a digital signal processor ("DSP"). The input/output devices 304 may be any peripheral device operating under the control of the processor 302 and configured to input data into or output data from the apparatus 300, such as, for example, network adapters, data ports, and various user interface devices such as a keyboard, a keypad, a mouse, or a display.

Memory 306 may be any type of memory suitable for storing electronic information, such as, for example, transitory random access memory (RAM) or non-transitory memory such as read only memory (ROM), hard disk drive memory, compact disk drive memory, optical memory, etc. The memory 306 may include data and instructions which, upon execution by the processor 302, may configure or cause the apparatus 300 to perform or execute the functionality or aspects described hereinabove (e.g., one or more steps of process 200). In addition, apparatus 300 may also include other components typically found in computing systems, such as an operating system, queue managers, device drivers, or one or more network protocols that are stored in memory 606 and executed by the processor 302.

While a particular embodiment of apparatus 300 is illustrated in FIG. 3, various aspects of in accordance with the present disclosure may also be implemented using one or more application specific integrated circuits (ASICs), field programmable gate arrays (FPGAs), or any other combination of hardware or software. For example, data may be stored in various types of data structures (e.g., linked list) which may be accessed and manipulated by a programmable processor (e.g., CPU or FPGA) that is implemented using software, hardware, or combination thereof.

Although aspects herein have been described with reference to particular embodiments, it is to be understood that these embodiments are merely illustrative of the principles and applications of the present disclosure. It is therefore to be understood that numerous modifications can be made to the illustrative embodiments and that other arrangements can be devised without departing from the spirit and scope of the disclosure.

The invention claimed is:

1. An apparatus for implementing a network element in a telecommunication network, the apparatus comprising:
   a processor configured to:
      receive a message for broadcast over the telecommunication network;
      determine a group of target receiver devices for the message;
      broadcast a decryption key over the telecommunication network based on the determined group of target receiver devices;
      encrypt and broadcast the message over the telecommunication network based on the determined group of target receiver devices;
      determine one or more actual receiver devices in the group of target receiver devices that successfully received and decrypted the message; and,
      generate one or more charging messages based on the determined actual receiver devices of the broadcasted message.

2. The apparatus of claim 1, wherein the processor is further configured to:
   receive one or more acknowledgement messages from one or more devices in the group of target devices; and,
   determine the one or more actual receiver devices in the group of target receiver devices that successfully received and decrypted the message based on the one or more acknowledgement messages.

3. The apparatus of claim 1, wherein the processor is further configured to generate at least one of the one or more charging messages as an Accounting Request Message using the Diameter protocol.

4. The apparatus of claim 1, wherein the processor is further configured to identify at least one of the determined actual receiver devices in at least one of the charging messages.

5. The apparatus of claim 1, wherein the processor is further configured to identify each of the determined actual receiver devices in at least one of the charging messages.

6. The apparatus of claim 1, wherein the apparatus is a Service Capability Server (SCS) network element or a Cell Broadcast Center (CBC) network element of the telecommunications network.

7. The apparatus of claim 1, wherein the processor is further configured to not generate a charging message for any device in the group of target receiver devices that is not determined as an actual receiver device of the broadcasted message.

8. The apparatus of claim 1, wherein the processor is further configured to generate at least one charging message for charging a sender-subscriber of the telecommunications network of the message based on the number of the determined actual receiver devices.

9. The apparatus of claim 1, wherein the processor is further configured to generate at least one charging message for charging a receiver-subscriber of the telecommunication network associated with at least one of the determined actual receiver devices.

10. The apparatus of claim 1, wherein the processor is further configured to determine the group of target receiver devices for the message based on the type of the message.

11. The apparatus of claim 1, wherein the processor is further configured to determine a group of target receiver devices for the message based on a group identifier.

12. The apparatus of claim 1, wherein the processor is further configured to determine the group of target receiver devices for the message based on a geographical area.

13. A method for implementing a network function in a telecommunication network, the method comprising:
   receiving a message for broadcast over the telecommunication network;
   determining a group of target receiver devices for the message;
   broadcasting a decryption key over the telecommunication network based on the determined group of target receiver devices;
   encrypting and broadcasting the message over the telecommunication network based on the determined group of target receiver devices;
   determining one or more actual receiver devices in the group of target receiver devices that successfully received and decrypted the message; and,
   generating one or more charging messages based on the determined actual receiver devices of the broadcasted message.

14. The method of claim 13, further comprising:
   receiving one or more acknowledgement messages from one or more devices in the group of target devices; and,
   determining the one or more actual receiver devices in the group of target receiver devices that successfully received and decrypted the message based on the one or more acknowledgement messages.

15. The method of claim 13, further comprising:
   generating at least one of the one or more charging messages as an Accounting Request Message using the Diameter protocol.

16. The method of claim 13, further comprising:
   identifying at least one of the determined actual receiver devices in at least one of the charging messages.

17. The method of claim 13, further comprising:
   not generating a charging message for any device in the group of target receiver devices that is not determined as an actual receiver device of the broadcasted message.

18. The method of claim 13, further comprising:
   generating at least one charging message for charging a sender-subscriber of the telecommunications network of the message based on the number of the determined actual receiver devices.

19. The method of claim 13, further comprising:
   generating at least one charging message for charging a receiver-subscriber of the telecommunication network associated with at least one of the determined actual receiver devices.

20. The method of claim 13, further comprising:
   determining the group of target receiver devices for the message based on a geographical area.

* * * * *